United States Patent [19]

Belanger

[11] Patent Number: 5,051,680
[45] Date of Patent: Sep. 24, 1991

[54] SIMPLE STARTING SEQUENCE FOR VARIABLE RELUCTANCE MOTORS WITHOUT ROTOR POSITION SENSOR

[75] Inventor: David J. Belanger, Rockford, Ill.

[73] Assignee: Sundstrand Corporation, Rockford, Ill.

[21] Appl. No.: 448,207

[22] Filed: Dec. 8, 1989

[51] Int. Cl.$^5$ .......................................... H02K 29/06
[52] U.S. Cl. .................................. 318/701; 318/254; 318/138
[58] Field of Search ............... 318/293, 701, 138, 254, 318/430, 431

[56] References Cited

U.S. PATENT DOCUMENTS

| | | | |
|---|---|---|---|
| 3,813,589 | 5/1974 | Boice | 318/701 X |
| 3,980,933 | 9/1976 | Pitakowski, Jr. | 318/138 |
| 4,450,396 | 5/1984 | Thornton | 318/721 |
| 4,520,302 | 5/1985 | Hill et al. | 318/696 |
| 4,611,157 | 9/1986 | Miller et al. | 318/696 |
| 4,642,543 | 2/1987 | MacMinn | 318/696 |
| 4,670,698 | 6/1987 | Fulton et al. | 318/802 |
| 4,722,839 | 9/1988 | MacMinn et al. | 318/696 |
| 4,746,850 | 5/1988 | Abbondanti | 318/723 |
| 4,763,058 | 8/1988 | Heining et al. | 318/807 |
| 4,777,419 | 10/1988 | Obradovic | 318/701 X |
| 4,800,324 | 1/1989 | Kuttner | 318/293 |
| 4,868,478 | 9/1989 | Hedlund et al. | 318/701 |
| 4,876,491 | 10/1989 | Squires et al. | 318/138 |

FOREIGN PATENT DOCUMENTS

| | | | |
|---|---|---|---|
| 8802574 | 4/1988 | World Int. Prop. O. | 318/701 |
| 8802951 | 4/1988 | World Int. Prop. O. | 318/701 |

Primary Examiner—Bentsu Ro
Attorney, Agent, or Firm—Antonelli, Terry, Stout & Kraus

[57] ABSTRACT

A rotor position sensing system (10) for a variable reluctance motor having a plurality of phases $\Phi_1$-$\Phi_3$ with each phase having a phase winding wound on stator poles (18, 20 and 22) and first and second switches ($Q_1$ and $Q_2$, $Q_3$ and $Q_4$, and $Q_5$ and $Q_6$) each having a first terminal, a control terminal and a second terminal, the control terminal of each switch having a control signal applied thereto to switch the switch between on and off states, the first terminal of the switch being coupled to a first power supply potential (30), the second terminal of the first switch being coupled to the phase winding, the first terminal of the second switch being coupled to a second power supply potential (32) and the second terminal being coupled to the phase winding which senses rotor position prior to activation of the phase windings to starting rotation of the rotor in accordance with the invention that includes a current sensor (34), coupled to each phase winding, for producing an output signal of a magnitude of current flowing in the windings; and a controller (26), coupled to each current sensor and to each control terminal of the switches, for applying control signals to the switches to cause current to flow between the power supply potentials through the phase windings and in response to the sensed magnitude of the current flow through the phase windings determining the position of the rotor with respect to the stator by determination of relative magnitude of the current flow through the phase windings.

11 Claims, 4 Drawing Sheets

FIG. 4

| φ | | | | | CURRENT LEVEL | | | | | |
|---|---|---|---|---|---|---|---|---|---|---|
| 1 | 1 | 1 | 3 | 3 | 1 | 1 | 2 | 2 | 3 | 3 |
| 2 | 1 | 3 | 1 | 3 | 3 | 2 | 3 | 1 | 2 | 1 |
| 3 | 3 | 1 | 1 | 3 | 3 | 2 | 1 | 3 | 1 | 2 |

| DIR-ECTION | | | | | ACTIVATED PHASES | | | | | |
|---|---|---|---|---|---|---|---|---|---|---|
| CW  | 2,3 | 1,2 | 3,1 | 2 | 3 | 1 | 2 | 3 | 1 | 3 |
| CCW | 1,3 | 3,2 | 2,1 | 3 | 1 | 2 | 3 | 1 | 2 | 1 |

SIMPLE STARTING SEQUENCE FOR VARIABLE RELUCTANCE MOTORS WITHOUT ROTOR POSITION SENSOR

TECHNICAL FIELD

The present invention relates variable (switched) reluctance motors. More particularly, the present invention relates to variable reluctance motors without shaft position sensors for applications requiring rotor position information.

BACKGROUND ART

Variable (switched) reluctance motors are known. Variable reluctance motors conventionally have multiple poles or teeth on both the stator or rotor which are doubly salient. Phase windings are wound on the stator. No windings are wound on the rotor. As a result of the rotor not having windings, variable reluctance motors may be used in applications where reduced weight or high speed rotation is required as a consequence of the simplified rotor structure provided by a variable reluctance motor.

Torque is produced in a variable reluctance motor by switching current on and off in each of the phase windings in a predetermined sequence. The switching is synchronized with the angular position of the rotor so that a magnetic force of attraction results between the rotor and the stator poles. The current is switched off in each phase before the rotor poles nearest the stator poles of that phase rotate past the aligned position. Torque developed by the variable reluctance motor is independent of the direction of current flow. As a result, an inverter drive may be used to supply current for driving the phase windings wound on the stator poles.

The controller of a variable reluctance motor switches the stator phase currents on and off in synchronization with the rotor. By properly positioning the time intervals during which switches in an inverter drive the phase windings of the stator, forward or reverse torque may be obtained. Thus for applications such as driving an actuator on an airframe where the direction of rotation is essential for proper operation, machine tool applications, etc., it is necessary to determine the position of the rotor with respect to the stator poles to insure that the correct timing sequence of activating the switches in the inverter driving the phase windings is activated for clockwise or counterclockwise rotation. Conventionally, the position of the rotor is determined by a rotor position signal being applied to the controller from a shaft position sensor such as an encoder or a resolver. However, the provision of a shaft position sensor in a variable reluctance motor is expensive, creates reliability problems, and adds weight to the rotor and overall motor.

Prior art variable reluctance motors are known which do not utilize a shaft position sensor. U.S. Pat. No. 4,642,543 discloses that a variable reluctance motor may be started by the steps of aligning the motor rotor by energizing a predetermined stator phase, stepping the stator phases at about the starting rate of the motor for a predetermined starting delay, checking the average total current flowing in the motor and returning to the aligning step if the average exceeds a predetermined value, and ramping up the starting rate to a desired running frequency. Thus, the '543 patent solves the problem of determining the position of the rotor in order to produce a proper starting sequence by insuring that the rotor is aligned to a predetermined position prior to execution of the starting sequence. U.S. Pat. No. 4,772,839 discloses a variable reluctance motor which senses the position of the rotor during rotation by measuring current in two idle phases, processing the measurements to provide a pair of possible rotor angles for each such phase and combining the angles in a fashion which yields a unique estimate of the instantaneous rotor position. If two phases do not remain unenergized throughout the sampling period or if any phase of the rotor experiences a change of state during the sampling period, an extrapolated rotor position is calculated in place of the estimated instantaneous rotor position. The system of the '839 patent is much more complicated than that of the present invention.

DISCLOSURE OF INVENTION

The present invention is a rotor position sensing system for a variable reluctance motor and a method of sensing position of a rotor of a variable reluctance motor. With the invention, each of the phase windings is pulsed with a voltage pulse by turning on switches of an inverter driving the phase windings to cause a current to flow in each of the phase windings. Current sensors in each of the phase windings measure the resultant current produced by the applied voltage pulse. The controller compares the relative magnitude of the current flow caused by the application of the voltage pulse to the phase windings to determine the position of the rotor with respect to the poles of the stator. The position of the rotor is determined as a function of the winding in which the smallest current flow is sensed which is the winding located farthest from the minimum reluctance position between the rotor and stator poles. As a consequence of the controller identifying the location of the rotor with respect to one of the phase windings, the controller in starting the motor in a clockwise or counterclockwise direction utilizes a predetermined switching sequence of the switches which is necessary to ensure starting in a desired clockwise or counterclockwise direction. As a result of determining the position of the rotor with respect to the phase windings of the stator, in airframe applications where a variable reluctance motor drives an actuator, it is possible to ensure that the actuator is driven in the correct direction which is of great importance in the reliability of an actuator drive system. Similarly for other applications such as, but not limited to, machine tools, it is possible to insure actuation in a desired direction.

A rotor position sensing system for a variable reluctance motor having a plurality of phases with each phase having a phase winding wound on stator poles and first and second switches each having a first terminal, a control terminal and a second terminal, the control terminal of each switch having a control signal applied thereto to switch the switch between on and off states, the first terminal of the first switch being coupled to a first power source potential, the second terminal of the first switch being coupled to the phase winding, the first terminal of the second switch being coupled to a second power source potential and the second terminal being coupled to the phase winding which senses rotor position prior to activation of the phase windings to start rotation of the rotor in accordance with the invention includes a current sensor, coupled to each phase winding, for producing an output signal of a magnitude of current flowing in the winding; and a controller, coupled to each current sensor and to each control terminal of the switches, for applying control signals to the switches to cause current to flow between the power source potentials through the phase windings prior to starting rotation of the rotor and in response to the magnitude of the current flow through the phase windings determining the position of the rotor with respect to the stator by determination of a relative magnitude of current flow through the phase windings prior to activation of the phase windings to start rotation of the rotor. The position of the rotor with respect to the stator prior to starting rotation of the rotor is determined as a position of poles of the rotor with respect to poles of the stator on which one of the phase windings of the stator is wound. The controller, in response to determining the position of the rotor with respect to the stator prior to initiating starting rotation of the rotor activates the switches in a predetermined sequence to cause the rotor to rotate in a predetermined direction of rotation. The controller determines the position of the rotor with respect to the stator prior to initiating starting rotation of the rotor; and as a function of the phase winding in which the smallest current flowed in response to connection of the phase winding to the power source potentials. The present invention is applicable to motors having at least two phases.

A rotor position sensing system for a variable reluctance motor having a plurality of phases with each phase having a phase winding wound on stator poles and at least one switch with each switch being coupled to a phase winding and having a control terminal to which is applied a control signal to switch the switch between on and off states for sensing a position of the rotor with respect to the stator poles prior to starting rotation of the rotor in accordance with the invention includes a current sensor, coupled to each phase winding, for producing an output signal of a magnitude of current flowing in the winding; and a controller, coupled to each current sensor and to each control terminal of the switches, for applying control signals to the switches to cause current to flow from a power supply through the phase windings prior to initiation of starting rotation of the rotor and in response to the sensed magnitude of the current flow through the phase windings determining the position of the rotor with respect to the stator by determination of a relative magnitude of the current flow through the phase windings as a function of the phase winding in which a smallest magnitude of current flowed in response to application of the potential difference prior to activation of the phase windings to start rotation of the rotor. The position of the rotor with respect to the stator is determined prior to starting rotation of the rotor as a position of poles on the rotor with respect to the poles of the stator on which one of the phase windings of the stator is wound. The controller, in response to determining the position of the rotor with respect to the stator prior to initiating starting rotation of the rotor, activates the switches in a predetermined sequence to cause the rotor to rotate in a predetermined direction of rotation.

A method of sensing position of a rotor of a variable reluctance motor with respect to a stator having a plurality of phases with each phase having a phase winding wound on stator poles prior to activation of the phase windings to start rotation of the rotor in accordance with the invention includes applying a potential difference to each of the phase windings to cause a current to flow in the phase windings prior to starting rotation of the rotor; sensing a relative magnitude of current flow in each of the windings prior to starting rotation of the rotor; and determining the position of the rotor in response to determination of the relative in each of the windings prior to activation of the phase windings to start rotation of the rotor as a function of the phase winding in which a smallest magnitude of current flowed in response to application of the potential difference. The position of the rotor is determined prior to starting rotation of the rotor in terms of a position of poles of the rotor with respect to poles of the stator. After determination of the position of the rotor, a potential difference is applied to the phase windings in a predetermined sequence to cause the rotor to rotate in a specified direction of rotation. The motor has at least two phases.

BRIEF DESCRIPTION OF DRAWINGS

FIG. 4 is a truth table utilized by the controller for activating the phase windings of the stator to cause rotation of the rotor as a function of the magnitude of current sensed in the phase windings.

BEST MODE FOR CARRYING OUT THE INVENTION

Figure 1B:
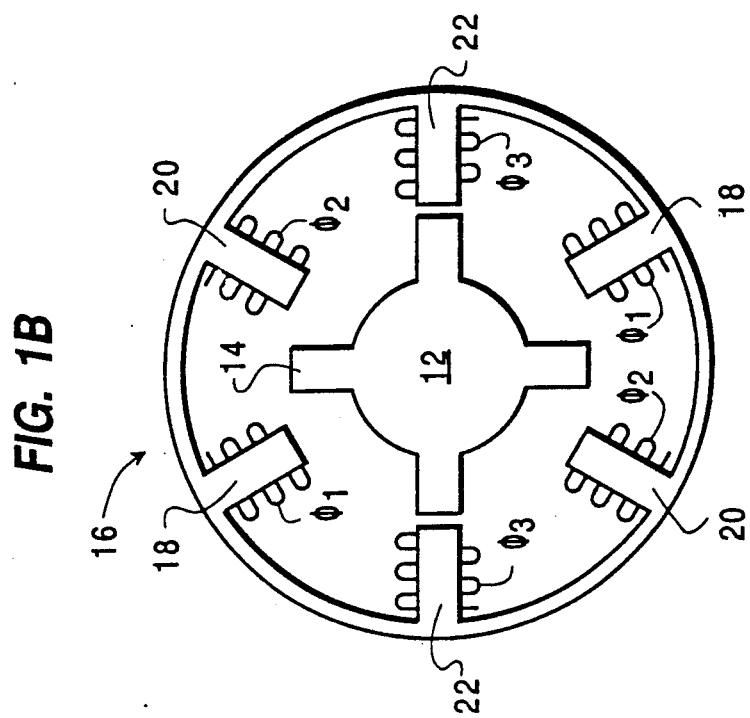
FIG. 1 illustrates a block diagram of an embodiment of the present invention.
Figure 1A:
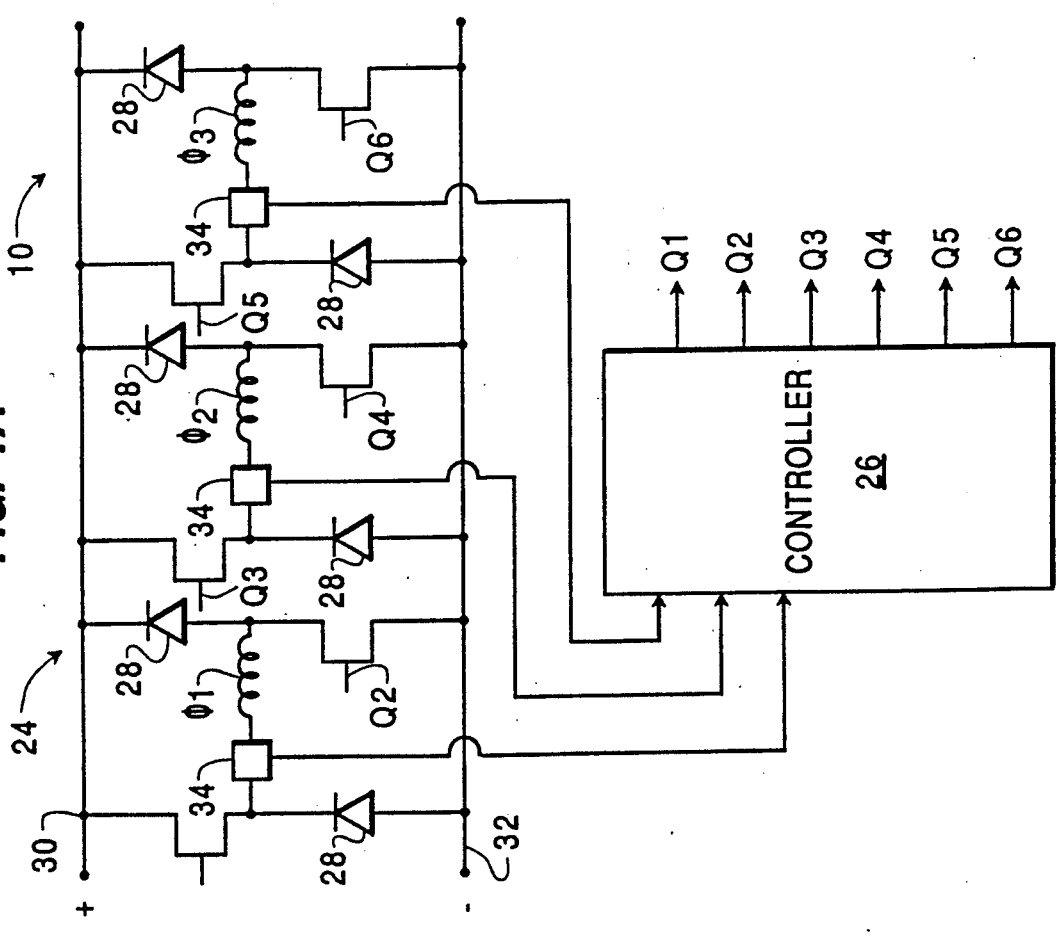

FIG. 1 illustrates a variable reluctance motor 10 in accordance with the present invention. The variable reluctance motor has a rotor 12 having a plurality of salient poles 14. A stator 16 has a plurality of pairs of salient poles 18, 20 and 22 on which respectively are wound series phase windings $\Phi_1$, $\Phi_2$ and $\Phi_3$. The construction of the rotor 12 and stator 16 is conventional with the exception of a position sensing device not being associated with the rotor. A drive circuit 24 is comprised of a plurality of transistor switches $Q_1$–$Q_6$. A first pair of transistor switches $Q_1$ and $Q_2$ drive a first phase winding $\Phi_1$ under the control of control signals $Q_1$ and $Q_2$ produced by controller 26. Similarly, a second pair of transistor switches $Q_3$ and $Q_4$ are driven by control signals $Q_3$ and $Q_4$ produced by controller 26 and a pair of switches $Q_5$ and $Q_6$ are driven by a pair of control signals $Q_5$ and $Q_6$ produced by controller 26. The generation of the control signals $Q_1$–$Q_6$ is conventional. A freewheeling diode 28 is connected in series between DC rails 30 and 32 which respectively are at different DC potentials. A current sensor 34, such as a hall effect device, is coupled to each of the phase windings $\Phi_1$–$\Phi_3$ for producing an output signal of a magnitude of current flowing in the winding as described below with reference to FIG. 3.

Figure 2:
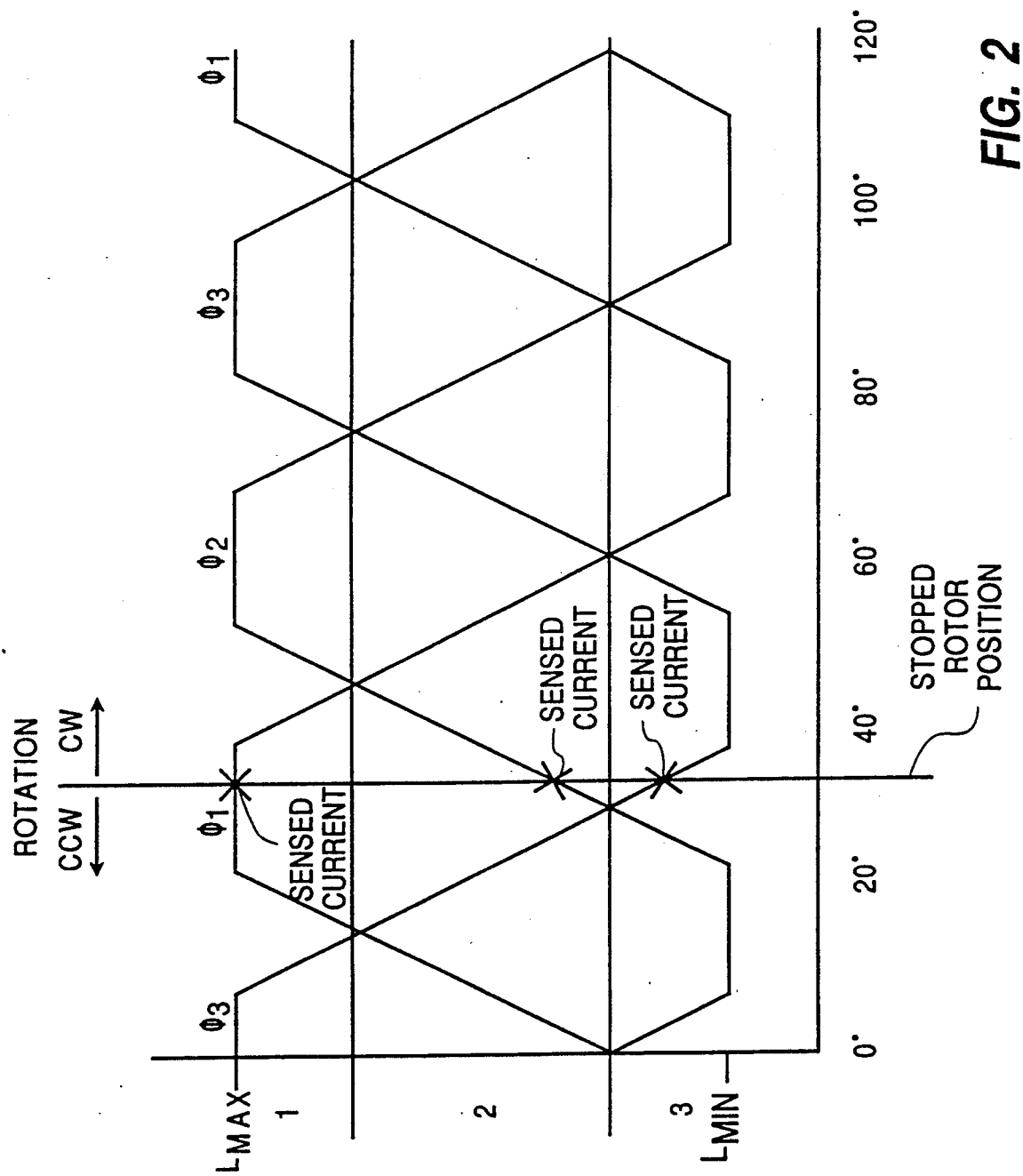
FIG. 2 illustrates variation of the inductance of each of the phase windings on the stator as a function of position of the rotor.

The controller 26 of the present invention determines the position of the rotor 12 with respect to the stator 16 by utilization of variation of the inductance of the phase windings of a variable reluctance motor as a function of position of the rotor. FIG. 2 illustrates graphically variation of the inductance of the phase windings of a three phase motor as a function of rotor position in degrees with respect to the stator. Furthermore, the invention is based upon the discovery that the application of an equal potential to all of the phase windings in a variable reluctance motor either at the same time or separated in time prior to starting will induce currents in each of the inductance of those phase windings. By sensing the relative magnitude of current flow in each of the phase windings which is inversely proportional to the inductance of those phase windings, it is possible to determine the position of the rotor. As is described below in the truth table of FIG. 4, the sensors 34 provide a signal which specifies the magnitude of the current flow in the phase winding $\Phi_1$-$\Phi_3$ associated with the sensor. The relative magnitude of the current in each phase winding $\Phi_1$-$\Phi_3$ is determined by the controller 26 to be within region 3 on the ordinate defined between $L_{MIN}$ and a first point where current flow in two windings is identical, to be within a region 2 on the ordinate between the first point and a second point where a lower current flow in two windings is identical or to be in a region 1 on the ordinate between the second point and $L_{MAX}$. By sensing the magnitude of current flow in the phase windings $\Phi_1$-$\Phi_3$ with respect to the aforementioned regions, the controller 26 resolves the position of the rotor to permit the choice of the appropriate sequence of control signals to be applied to the switches to produce a desired clockwise or counterclockwise rotation. The vertical line identifies a typical stopped position of the rotor with the "sensed current" representing the relative magnitude of current caused to flow by connection to the DC power supply potential.

Figure 3:
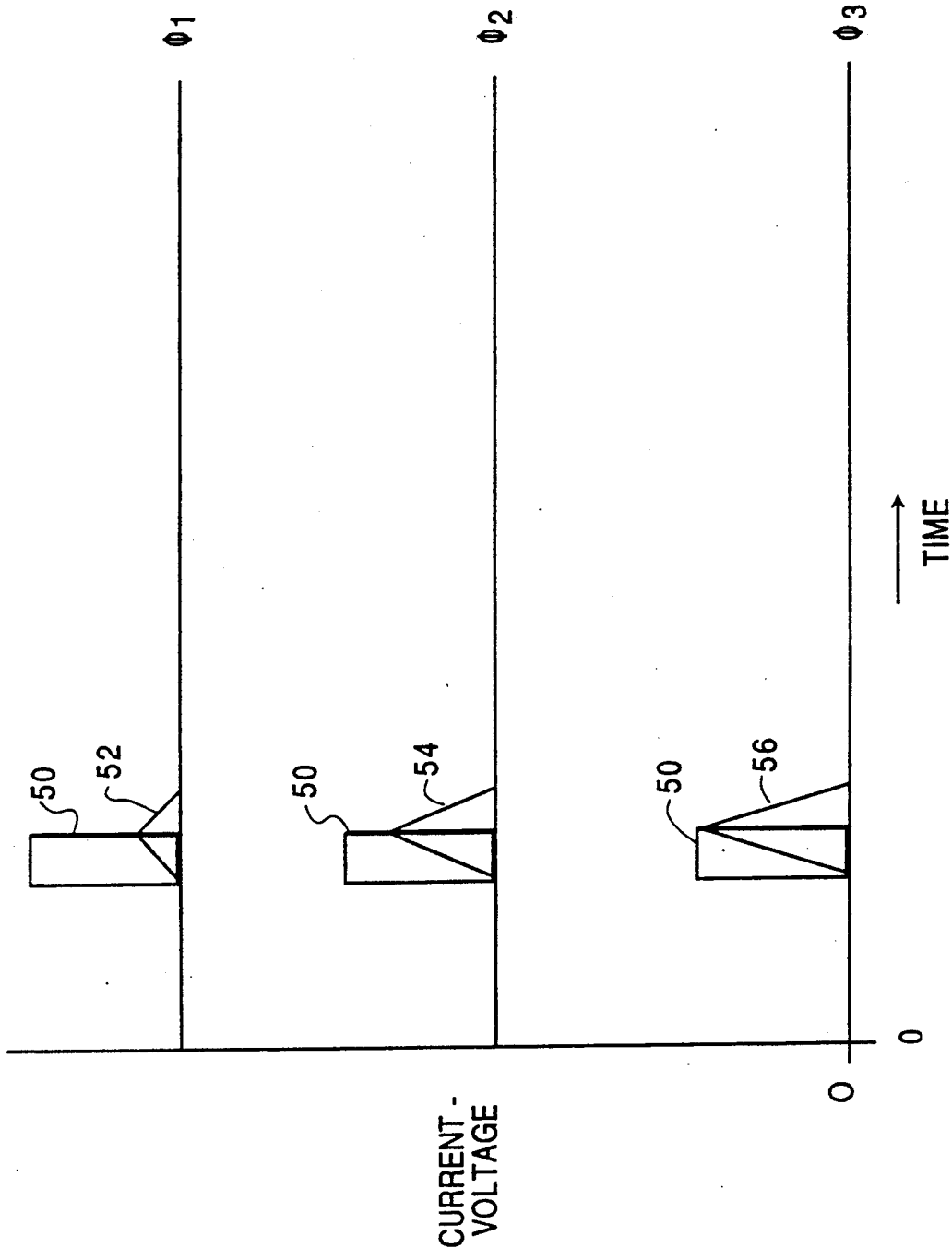
FIG. 3, illustrates an applied voltage and a resultant current produced in each of the phase windings of the stator which is used in determining the position of the rotor with respect to the stator.

FIG. 3 illustrates graphically voltage and current pulses produced during the determination of the rotor position by the controller 26. The ordinate illustrates voltage and current as described below. The abscissa illustrates time. The controller 26 applies control signals $Q_1$-$Q_6$ to each of the switches $Q_1$-$Q_6$ simultaneously to apply a voltage pulse 50 of equal magnitude and duration to each of the phase windings. The resultant current pulses 52-56 are sensed by the sensors 34 simultaneously or time displaced. The controller 26 determines the relative magnitude of the current pulses 52-56 with respect to the aforementioned regions.

FIG. 4 illustrates a truth table for activating the phases to cause clockwise or counterclockwise rotation. Clockwise rotation activates the phases in the order 1, 2, 3 and counterclockwise rotation activates the phases 1, 3, 2. The current level values are the sensed current flows determined by the controller 26 with respect to the current levels described above in FIG. 2. For clockwise rotation (cw) or counterclockwise rotation (ccw), the sequence of activated phases are the sequence of phases stored in the memory which, after position of the rotor is determined, are read out from memory and activated to cause rotation.

The sensed current states requiring two windings to be energized contained in the truth table for a given set of current levels are unstable positions in which the rotor poles 14 are aligned in a minimum reluctance position with the stator poles 18-22 or the rotor is in a position where a direction of rotation is uncertain when current levels in two windings are approximately equal and low. All other positions of the rotor 12 are stable and are identified by determining the winding in which a smallest current flow occurs. For unstable positions the position of the rotor is a function of the winding in which the smallest current flowed and the relative magnitude of current flow in the windings.

With the position information, the controller in response to a command to cause rotation of the motor chooses a predetermined activation sequence of the switches $Q_1$-$Q_6$ for causing clockwise or counterclockwise rotation. As is apparent, the position of the rotor is resolved by determining the relative magnitude of current flow in the phase windings $\Phi_1$-$\Phi_3$ which permits the correct sequence of control signals $Q_1$-$Q_6$ to be applied to the switches $Q_1$-$Q_6$ to produce a desired clockwise or counterclockwise rotation which is important for applications which require absolute certainty in which the variable reluctance motor is to be rotated.

While the invention has been described in terms of a three phase motor, it should be understood that the invention may be practiced with variable reluctance motors having two or more phases. When the present invention is practiced with a variable reluctance motor having four or more phases, the resolution of the position of the rotor with respect to the stator poles is identical to the resolution described above with respect to three phases in FIG. 4 with the exception that the relative magnitude of current flow caused in the four or more phases must be examined in a manner analogous to the truth table of FIG. 4 and is a function of the phase winding(s) in which the smallest current flows. Once the position of the rotor is known with respect to the poles of the stator, the controller utilizes a predetermined sequence of control signals for causing clockwise or counterclockwise rotation. The only difference is that for four or more phases additional sequences of starting pulses will be required for clockwise or counterclockwise rotation as a result of the greater number of possible rotor positions.

While the invention has been described in terms of its preferred embodiment, it should be understood that numerous modifications may be made thereto without departing from the spirit and scope of the present invention as defined in the appended claims. For example, while the drive circuit 24 preferably has a pair of switches for each phase, the invention may also be practiced with a single switch per phase having a bifilar winding magnetically linking a primary and secondary phase winding. It is intended that all such modifications fall within the scope of the appended claims.

I claim:

1. A rotor position sensing system for a variable reluctance motor having a plurality of phases with each phase having a phase winding wound on stator poles and first and second switches each having a first terminal, a control terminal, and a second terminal, the control terminal of each switch having a control signal applied thereto to switch the switch between on and off states, the first terminal of the first switch being coupled to a first power source potential, the second terminal of the first switch being coupled to the phase winding, the first terminal of the second switch being coupled to a second power source potential and the second terminal being coupled to the phase winding which senses rotor position prior to activation of the phase windings to start rotation of the rotor comprising:

a current sensor, coupled to each phase winding, for producing an output signal of a magnitude of current flowing in the winding; and a controller, coupled to each current sensor and to each control terminal of the switches, for applying control signals to the switches to cause current to flow between the power source potentials through the phase windings and in response to the sensed magnitude of the current flow through the phase windings determining prior to starting rotation of the rotor the position of the rotor with respect to the stator by determination of relative magnitude of the current flow through the phase windings prior to activation of the phase windings to start rotation of the rotor.

2. A system in accordance with claim 1 wherein: the position of the rotor with respect to the stator prior to starting rotation of the rotor is determined as a position of poles on the rotor with respect to the poles of the stator on which one of the phase windings of the stator is wound.

3. A system in accordance with claim 1 wherein: the controller, in response to determining the position of the rotor with respect to the stator prior to initiating starting rotation of the rotor, activates the switches in a predetermined sequence to cause the rotor to rotate in a predetermined direction of rotation.

4. A system in accordance with claim 2 wherein: the controller, in response to determining the position of the rotor with respect to the stator prior to initiating starting rotation of the rotor, activates the switches in a predetermined sequence to cause the rotor to rotate in a predetermined direction of rotation.

5. A system in accordance with claim 1 wherein: the controller determines the position of the rotor with respect to the stator prior to initiating a starting rotation of the rotor as a function of the phase winding in which the smallest current flowed in response to connection of the power source potential to the phase winding.

6. A system in accordance with claim 2 wherein: the controller determines the position of the poles of the rotor prior to initiating starting rotation of the rotor with respect to poles of the stator as a function of the phase winding in which the smallest current flowed in response to connection of the power source potential to the phase winding.

7. A system in accordance with claim 3 wherein: the controller determines the position of the rotor with respect to the stator prior to initiating starting rotation of the rotor as a function of the phase winding in which the smallest current flowed in response to connection of the power source potential to the phase winding.

8. A system in accordance with claim 4 wherein: the controller determines the position of the poles of the rotor with respect to poles on the stator prior to initiating starting rotation on the rotor as a function of the phase winding in which the smallest current flowed in response to connection of the power source potential to the phase winding.

9. A system in accordance with claim 1 wherein: the motor has at least two phases.

10. A system in accordance with claim 1 wherein: the motor has three phases.

11. A system in accordance with claim 1 wherein: the motor has at least three phases.

* * * * *